(12) United States Patent
Shiraishi

(10) Patent No.: US 7,142,338 B2
(45) Date of Patent: Nov. 28, 2006

(54) OPTICAL MULTI-BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 68 days.

(21) Appl. No.: 10/810,707

(22) Filed: Mar. 29, 2004

(65) Prior Publication Data

US 2005/0213176 A1    Sep. 29, 2005

(51) Int. Cl.
*G02B 26/08* (2006.01)

(52) U.S. Cl. ...................................... 359/204

(58) Field of Classification Search ............... 359/204, 359/212–216; 347/233–235, 243; 250/234–236
See application file for complete search history.

(56) References Cited

U.S. PATENT DOCUMENTS

| 6,194,713 | B1 * | 2/2001 | Kanazawa | 250/234 |
| 6,229,656 | B1 * | 5/2001 | Omura | 359/796 |
| 6,501,585 | B1 | 12/2002 | Shiraishi et al. | |
| 2003/0043441 | A1 | 3/2003 | Azami et al. | |

FOREIGN PATENT DOCUMENTS

| JP | 11-194285 A | 7/1999 |
| JP | 2002-267968 A | 9/2002 |
| JP | 3367313 B2 | 11/2002 |
| JP | 2003-222811 A | 8/2003 |

* cited by examiner

*Primary Examiner*—Euncha P. Cherry
(74) *Attorney, Agent, or Firm*—Foley & Lardner LLP

(57) ABSTRACT

It is an object of the present invention to provide an optical multi-beam scanning device and an image forming apparatus which adopt a horizontal synchronization sensor and can suppress displacement in a horizontal scanning direction even when latent images are written on a surface to be scanned by a plurality of light beams tilting with respect to the surface to be scanned.

In the optical multi-beam scanning device of the present invention, when the light beams are assumed to reach the surface to be scanned with the light beams not being folded, the horizontal synchronization sensor is tilted so as to output a horizontal synchronized signal when the light beams come to the same position on the surface to be scanned in the horizontal scanning direction. In another method, the horizontal synchronization sensor is not tilted, and the similar function is executed by setting a boundary position between a shielding portion and a non-shielding portion of a light shielding member provided on an upper stream side. The image forming apparatus of the present invention adopts the optical multi-beam scanning device of the present invention.

8 Claims, 11 Drawing Sheets

FIG.4
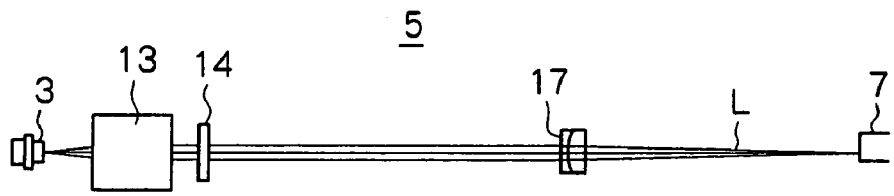
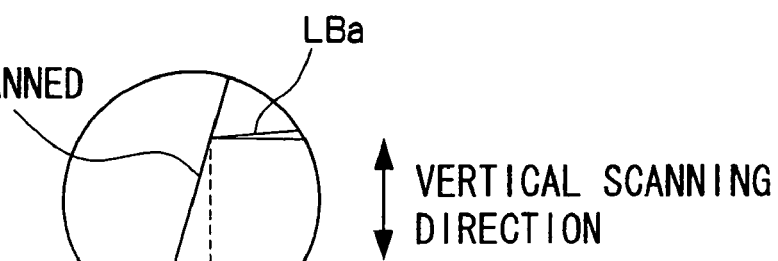
ENLARGED DIAGRAM IN VERTICAL SCANNING DIRECTION
FIG.5A
FIG.5B
HORIZONTAL SCANNING DIRECTION
FIG.5C
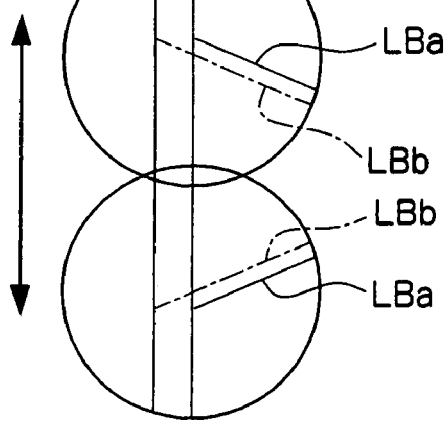
ENLARGED DIAGRAM IN HORIZONTAL SCANNING DIRECTION

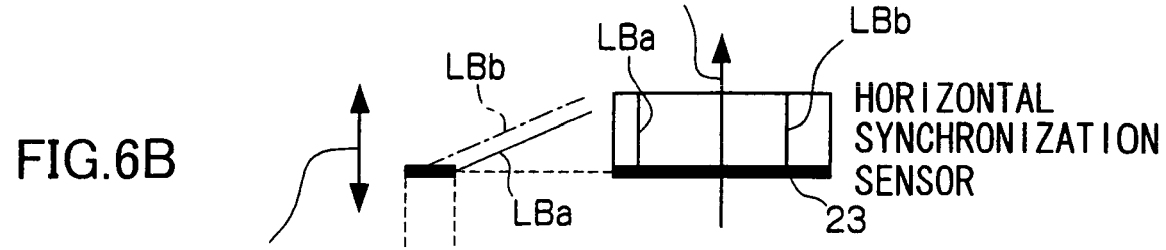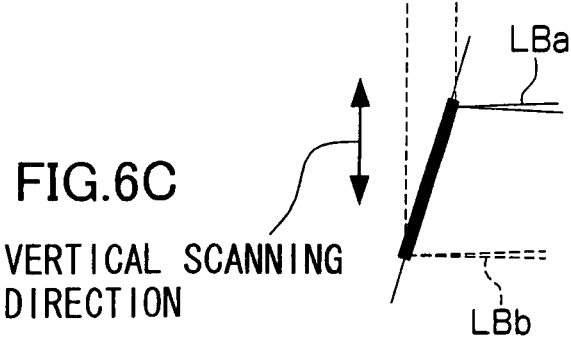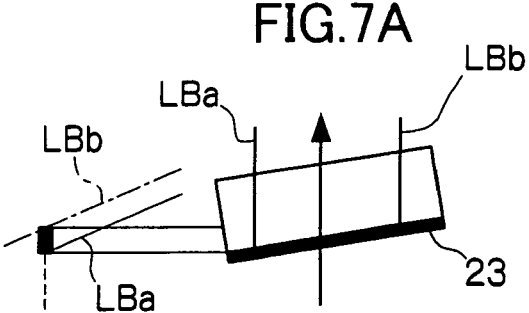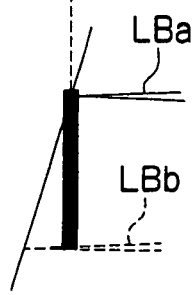

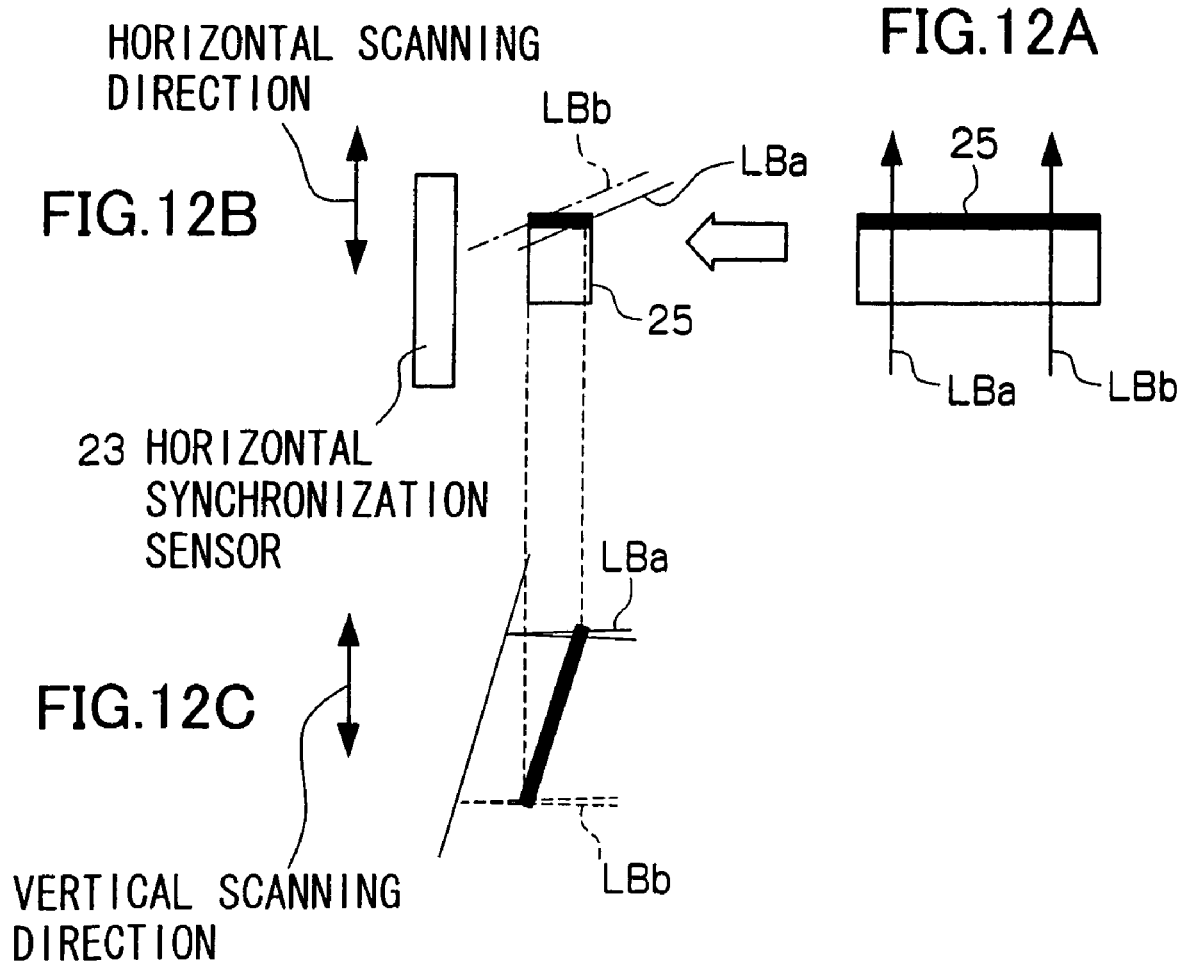
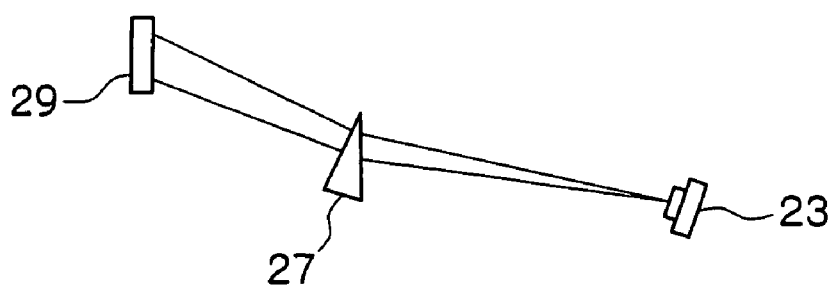

OPTICAL MULTI-BEAM SCANNING DEVICE AND IMAGE FORMING APPARATUS

BACKGROUND OF THE INVENTION

1. Field of the Invention

The invention relates to an image forming apparatus such as a composite machine which bears the copying function and the printing function of a copying machine and a printer, and an optical multi-beam scanning device which is mounted on the image forming device. Specifically, the invention relates to the optical multi-beam scanning device for writing latent images using a plurality of light beams on one photosensitive drum, and the image forming apparatus.

2. Description of the Related Art

In the case where a surface to be scanned on a photosensitive drum is scanned by an optical scanning device, when a light beam vertically enters the photosensitive drum, a part of the light beam which enters the photosensitive drum reflects so as to return to a light deflecting device. The reflected light beam is reflected as a secondary reflected light so as to return to the surface to be scanned again become a fixed stray light. For this reason, in general, a light beam is allowed to enter the photosensitive drum at an angle which tilts with respect to a vertical scanning direction. In this case, one light beam does not arise a problem, but when latent images are written by a plurality of light beams, a distance from a deflector to an image surface varies with the light beams. For this reason, a value "f" of an fθ characteristic varies with the light beams, and when an image is written with one image frequency, a position in a horizontal scanning direction shifts.

In a circle A of FIG. 18, conventional emitting positions of two light beams LBa and LBb in the vertical scanning direction are enlarged, and in a circle B of FIG. 18, conventional emitting positions of the two light beams LBa and LBb at one scanning end of the horizontal scanning direction are enlarged. Since an optical path from the light beam LBa to a surface to be scanned (the surface of photosensitive drum) SUR is shorter than that from the light beam LBb to the surface to be scanned, a displacement ΔH takes place between the light beams LBa and LBb even in the horizontal scanning direction at the same deflection angle according to a difference ΔD of the optical path lengths as shown in the circle B of FIG. 18.

Such a method of solving the displacement in the horizontal scanning direction is disclosed in U.S. Patent Publication No. 2003/0043441 A1.

In the method disclosed in this publication, different wavelengths are applied to two light beams, and a difference in magnification due to a difference of optical paths is canceled by magnification chromatic aberration of a post-deflection optical imaging system so that displacement is removed. A horizontal synchronized signal is input directly into a sensor without through the post-deflection optical imaging system, and when the beams come to the same position on the surface to be scanned, they are detected.

In the method disclosed in the publication, however, write timing of an image is determined based on an output of a horizontal synchronization sensor for detecting light beams which do not go through the post-deflection optical imaging system. For this reason, the following problems (1) to (3) arise.

(1) In order to allow the light beams which do not go through the post-deflection optical imaging system to enter the sensor for detecting light beams to produce the horizontal synchronized signal, it is necessary to secure a sufficient distance in the horizontal scanning direction from a light beam which goes through the post-deflection optical imaging system so as to be imaged on an image effective area to a light beam for obtaining horizontal synchronization (since an edge portion of the optical system cannot be used, the light beam for horizontal synchronization should be made to pass through the outside of the edge portion). As a result, it is necessary to enlarge a size of a polygon mirror or decrease a number of surfaces of the polygon mirror. When the size of the polygon mirror is increased, windage increases, and heat generation and noise become large. On the other hand, when a number of the surfaces of the polygon mirror is decreased, it is necessary to heighten a revolution speed in order to cope with a uniform process speed. As a result, windage increases, and heat generation and noise become large.

(2) An arrangement of optical elements in the post-deflection optical imaging system or a principal ray emitted from a pre-deflection optical system occasionally deviates from a design value. In this case, a time difference that a plurality of beams reaches a predetermined position of the horizontal synchronization sensor occasionally shifts from a time difference that the beams reach a predetermined position on the surface to be scanned.

(3) A relative position relationship among the beams on the surface to be scanned is not maintained on the surface of the horizontal synchronization sensor to which a plurality of beams which do not go through the post-deflection optical imaging system are given. That is to say, the horizontal synchronization sensor cannot be provided with a function for detecting the beam relative position and cannot make a control using an actuator based on the information about the beam relative position.

SUMMARY OF THE INVENTION

It is an object of the present invention to provide an optical multi-beam scanning device which can suppress displacement in a horizontal scanning direction even when a horizontal synchronization sensor to which a light beam similar to that to be given to a surface to be scanned is given and latent images are written on the surface to be scanned by a plurality of light beams tilting with respect to the surface to be scanned, and an image forming apparatus which adopts the optical multi-beam scanning device.

An optical multi-beam scanning device of the present invention is characterized by including: a plurality of light sources; deflecting means for deflecting light beams from the light sources; post-deflection optical means for making the light beams deflected by the deflecting means enter a surface to be scanned in a vertical scanning direction with respect to a normal direction of the surface to be scanned at a predetermined angle; horizontal synchronization detecting means for synchronizing the light beams in a horizontal scanning direction; and optical path folding means for folding the light beams directing towards the surface to be scanned to the horizontal synchronization detecting means. The optical multi-beam scanning device is characterized in that when the light beams are assumed to reach the surface to be scanned with the light beams not being folded by the optical path folding means, a light receiving surface of the horizontal synchronization detecting means is tilted so as to output a horizontal synchronized signal when the light beams come to the same position on the surface to be scanned in the horizontal scanning direction.

Furthermore, an optical multi-beam scanning device of another invention is characterized by including: a plurality of light sources; deflecting means for deflecting light beams from the light sources; post-deflection optical means for making the light beams deflected by the deflecting means enter a surface to be scanned in a vertical scanning direction with respect to a normal direction of the surface to be scanned at a predetermined angle; horizontal synchronization detecting means for synchronizing the light beams in a horizontal scanning direction; optical path folding means for folding the light beams directing towards the surface to be scanned to the horizontal synchronization detecting means; and a light shielding member having a tilt such that when the light beams are assumed to reach the surface to be scanned with the light beams not being folded by the optical path folding means, the light beams are emitted to a light receiving surface of the horizontal synchronization detecting means with a uniform rate when the light beams come to the same position on the surface to be scanned.

Further, an optical multi-beam scanning device of another invention is characterized by including: a plurality of light sources; deflecting means for deflecting light beams from the light sources; post-deflection optical means for making the light beams deflected by the deflecting means enter a surface to be scanned in a vertical scanning direction with respect to a normal direction of the surface to be scanned at a predetermined angle; horizontal synchronization detecting means for synchronizing the light beams in a horizontal scanning direction; and optical path folding means for folding the light beams directing towards the surface to be scanned to the horizontal synchronization detecting means. The optical multi-beam scanning device is characterized in that an optical element for changing an emitting angle according to a fluctuation in the wavelengths of the light beams emitted from the light sources is arranged on an optical path between the deflecting means and the horizontal synchronization detecting means.

Further, an optical multi-beam scanning device of another invention is characterized by including: a plurality of light sources; deflecting means for deflecting light beams from the light sources; post-deflection optical means for making the light beams deflected by the deflecting means enter a surface to be scanned in a vertical scanning direction with respect to a normal direction of the surface to be scanned at a predetermined angle; horizontal synchronization detecting means for synchronizing the light beams in a horizontal scanning direction; and optical path folding means for folding the light beams directing towards the surface to be scanned to the horizontal synchronization detecting means. The optical multi-beam scanning device is characterized in that the optical path folding means changes an emitting angle according to a fluctuation in wavelengths of the light beams emitted from the light sources.

BRIEF DESCRIPTION OF THE DRAWINGS

FIG. 4 is an explanatory diagram illustrating components of a pre-deflection optical system in the optical multi-beam scanning device according to the first embodiment;

FIGS. 5A to 5C are diagrams explaining a plurality of beams to be detected by a horizontal synchronization sensor according to the first embodiment;

FIGS. 6A to 6C are diagrams explaining a first posture example of the horizontal synchronization sensor according to the first embodiment;

FIGS. 7A to 7C are diagrams explaining a second posture example of the horizontal synchronization sensor according to the first embodiment;

FIGS. 12A to 12C are diagrams explaining a function of a light shielding member according to the second embodiment;

FIG. 13 is a schematic plan view illustrating an optical path between a folding mirror which folds an optical path to the horizontal synchronization sensor and the horizontal synchronization sensor according to a third embodiment;

DETAILED DESCRIPTION OF THE INVENTION

An optical multi-beam scanning device and an image forming apparatus according to preferred embodiments of the present invention are explained below with reference to the drawings.

(A) First Embodiment

Figure 1:
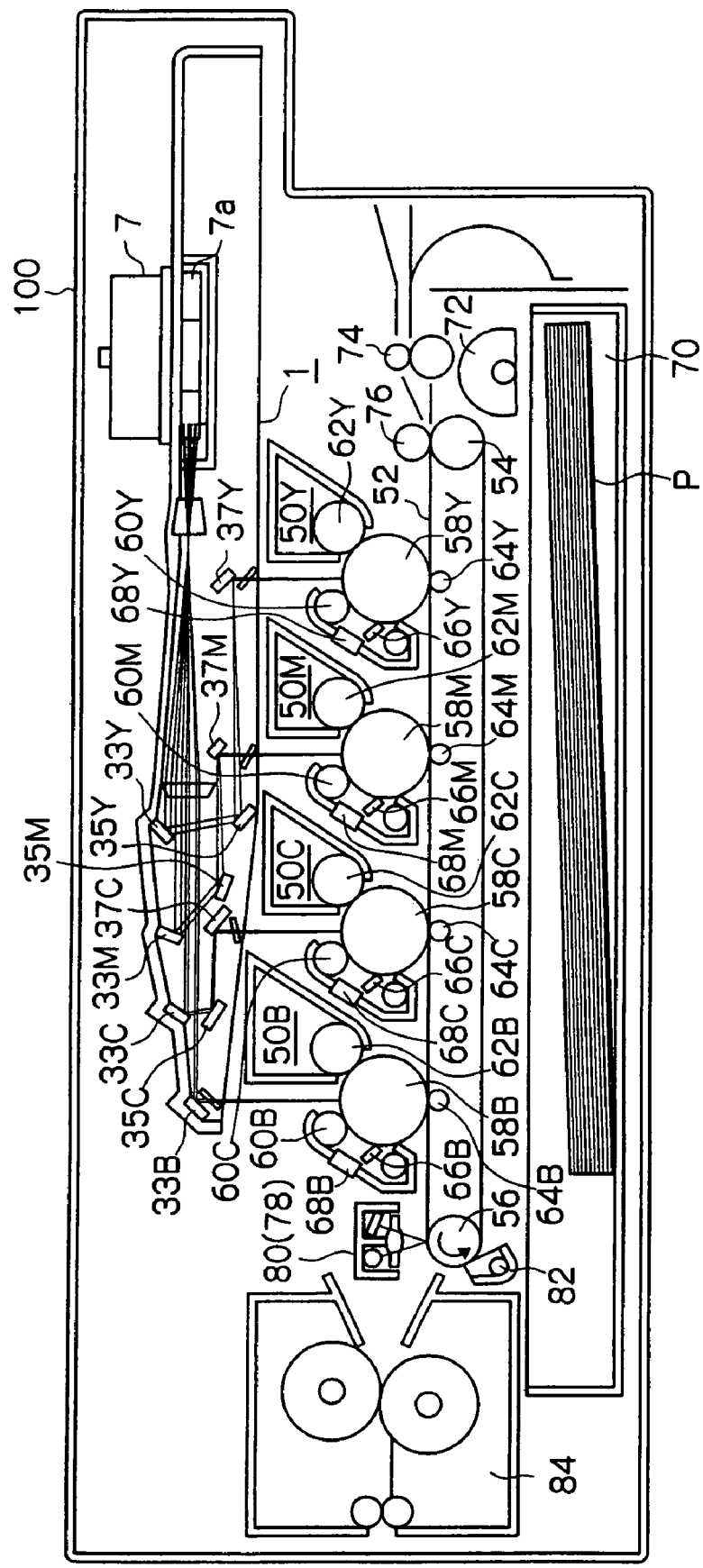
FIG. 1 is a schematic sectional view illustrating a color image forming apparatus according to a first embodiment of the present invention.

FIG. 1 is a diagram illustrating a color image forming apparatus into which the optical multi-beam scanning device according to a first embodiment of the present invention is incorporated. This kind of the color image forming apparatus utilizes four sets of various devices which form four kinds of image data separated into color components of Y (yellow), M (magenta), C (cyan), and B (black) and form images for the respective color components corresponding to Y, M, C and B. For this reason, Y, M, C and B are added to respective reference numerals so that the image data for the respective color components and the devices are discriminated.

As shown in FIG. 1, an image forming apparatus 100 has first to fourth image forming sections 50Y, 50M, 50C and 50B for forming images for color-separated color components.

The image forming sections 50Y, 50M, 50C and 50B are arranged in this order below an optical scanning device 1 correspondingly to positions where laser beams L (Y, M, C and B) are emitted. The laser beams are used for optically scanning image information about the color components using a first folding mirror 33B and third folding mirrors 37Y, 37M and 37C of an optical multi-beam scanning device 1, detailed with reference to FIGS. 2 and 3.

A conveyance belt 52 for conveying a transfer material on which the images formed via the image forming sections 50 (Y, M, C and B) are transferred is arranged below the image forming sections 50 (Y, M, C and B).

The conveyance belt 52 is entrained between a belt driving roller 56 and a tension roller 54 which are rotated to a direction of a narrow by a motor, not shown. The conveyance belt 52 is rotated at a predetermined speed to a direction where the belt driving roller 56 rotates.

The image forming sections 50 (Y, M, C and B) have photosensitive drums 58Y, 58M, 58C and 58B which are a cylindrical shape rotatable to a direction of an arrow, respectively. Electrostatic latent images corresponding to the images exposed by the optical scanning device 1 are formed on the photosensitive drums.

Charging devices 60 (Y, M, C and B), developing devices 62 (Y, M, C and B), transfer devices 64 (Y, M, C and B), cleaners 66 (Y, M, C and B), and discharger 68 (Y, M, C and B) are arranged in this order, respectively around the photosensitive drums 58 (Y, M, C and B) along the direction where the photosensitive drums 58 (Y, M, C and B) rotate. The charging devices 60 (Y, M, C and B) provide predetermined electric potentials to the surfaces of the photosensitive drums 58 (Y, M, C and B). The developing devices 62 (Y, M, C and B) supply toner having colors corresponding to the electrostatic latent images formed on the surfaces of the photosensitive drums 58 (Y, M, C and B) so as to develop the images. The transfer devices 64 (Y, M, C and B) are arranged so as to be opposed to the photosensitive drums 58 (Y, M, C and B) on a rear surface of the conveyance belt 52 with the conveyance belt 52 intervening between the transfer devices and the photosensitive drums. The transfer devices 64 (Y, M, C and B) transfer the toner images on the photosensitive drums 58 (Y, M, C and B) onto a recording medium conveyed by the conveyance belt 52, namely, recording paper P. The cleaners 66 (Y, M, C and B) eliminate residual toner on the photosensitive drums 58 (Y, M, C and B) which is not transferred when the transfer devices 64 (Y, M, C and B) transfers the toner images onto the paper P. The discharger 68 (Y, M, C and B) remove residual potentials which remain on the photosensitive drums 58 (Y, M, C and B) after the transfer devices 64 (Y, M, C and B) transfer the toner images.

A paper cassette 70 for housing the recording paper P onto which the images formed by the image forming sections 50 (Y, M, C and B) are transferred is arranged below the conveyance belt 52.

A feeding roller 72 which is primarily formed into a half-moon shape and takes out the paper P housed in the paper cassette 70 one by one starting from the top is arranged on one end of the paper cassette 70 which is close to a tension roller 54.

A register roller 74 for aligning a forward end of one piece of paper P taken out of the cassette 70 with a forward end of the toner image formed on the photosensitive drum 58B of the image forming section 50B (black) is arranged between the feeding roller 72 and the tension roller 54.

An absorption roller 76 is arranged in a position which is in a vicinity of the tension roller 54 between the register roller 74 and the first image forming section 50Y and is substantially opposed to an outer periphery of the conveyance belt 52 corresponding to a position where the tension roller 54 contacts with the conveyance belt 52. The adsorption roller 76 provides a predetermined electrostatic adsorption force to one piece of paper P conveyed at predetermined timing by the register roller 74.

Registration sensors 78 and 80 are arranged on the outer periphery of the conveyance belt 52 which is one end of the conveyance belt 52 and in a vicinity of the belt driving roller 56 and substantially contacts with the belt driving roller 56 with a predetermined distance in an axial direction of the belt driving roller 56 (since FIG. 1 is a front sectional view, the first sensor 78 positioned on a front side of the sheet in FIG. 1 cannot be seen). The registration sensors 78 and 80 detect positions of images formed on the conveyance belt 52 or positions of images transferred onto the paper P.

A conveyance belt cleaner 82 is arranged in a position which is on the outer periphery of the conveyance belt 52 contacting with the belt driving roller 56 and does not contact with the paper P conveyed by the conveyance belt 52. The conveyance belt cleaner 82 removes toner or slip of paper adhering to the conveyance belt 52.

A fixing device 84 is arranged in a direction where the paper P conveyed by the conveyance belt 52 is separated from the belt driving roller 56 and is further conveyed. The fixing device 84 fixes the toner images transferred onto the paper P to the paper P.

Figure 2:
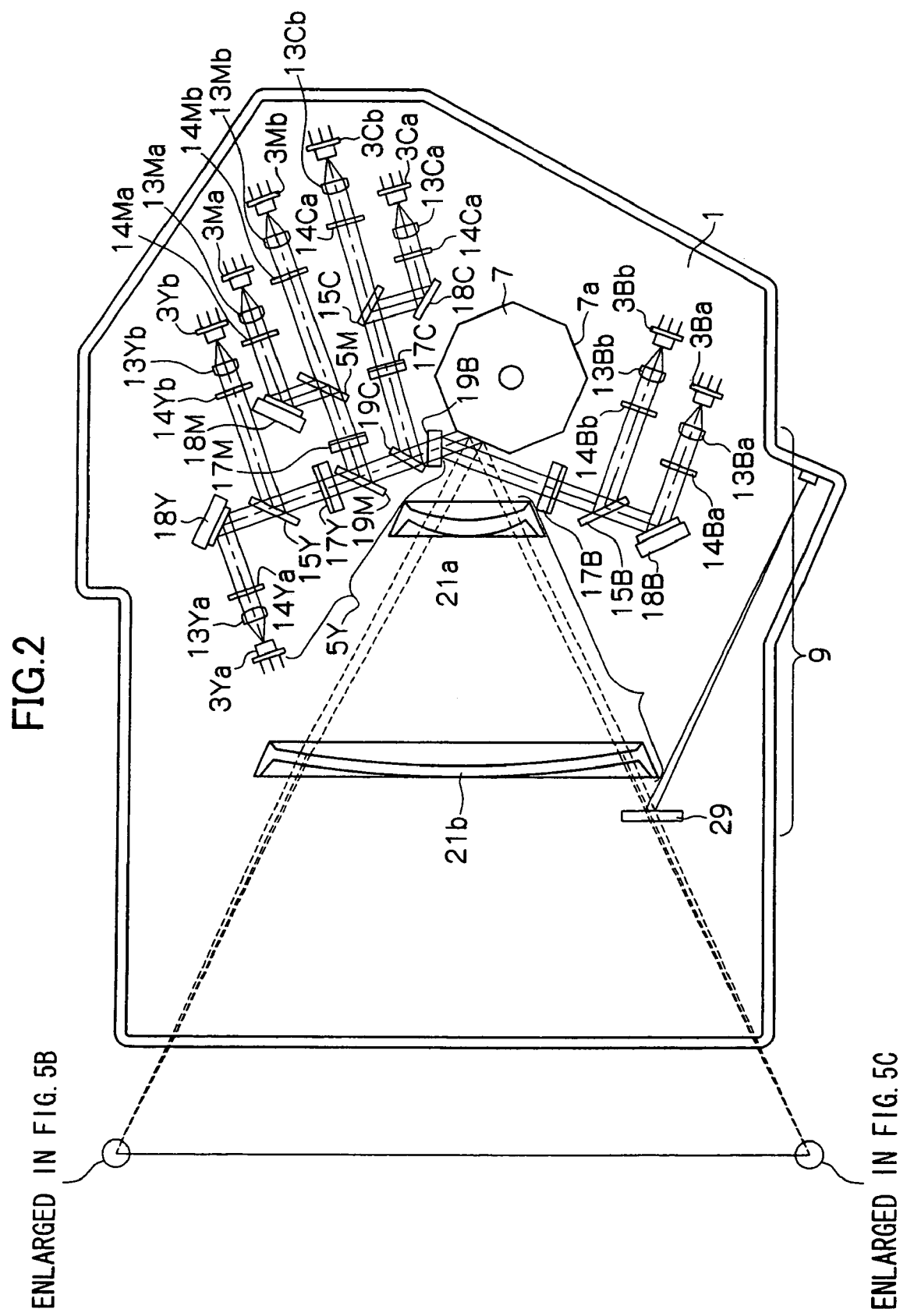
FIG. 2 is a schematic plan view illustrating an optical multi-beam scanning device according to the first embodiment.
Figure 3:
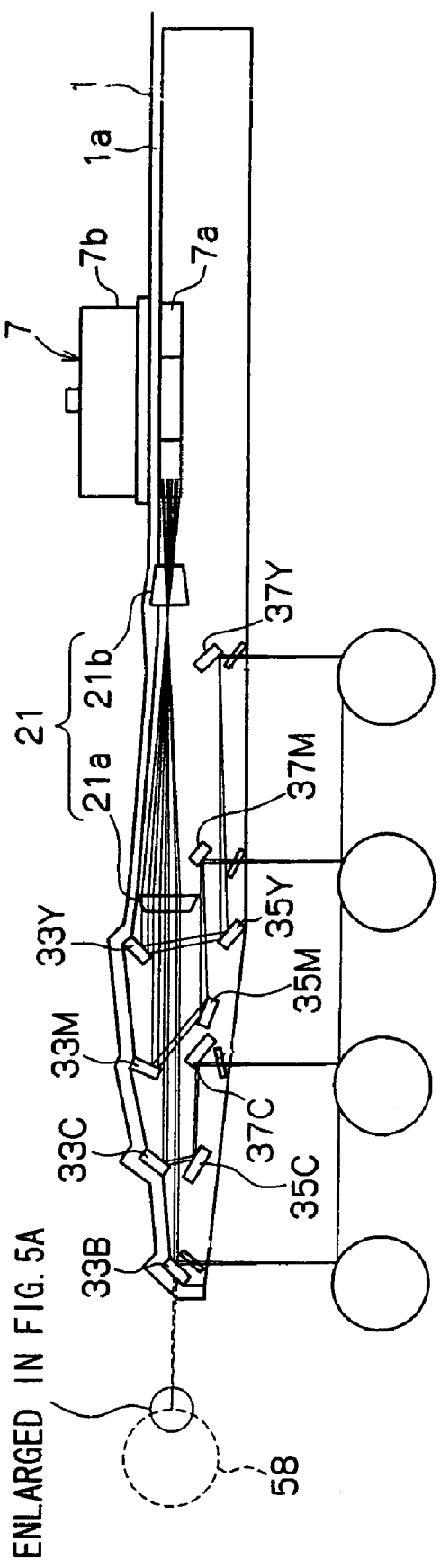
FIG. 3 is an explanatory diagram illustrating components of a post-deflection optical system in the optical multi-beam scanning device according to the first embodiment.

FIGS. 2 and 3 are diagrams illustrating the optical multi-beam scanning device which is incorporated into the image forming device shown in FIG. 1.

The optical multi-beam scanning device 1 has light sources 3Y, 3M, 3C and 3B, and a light deflecting device 7 as deflecting means. The light sources 3Y, 3M, 3C and 3B output light beams to the first to fourth image forming sections 50Y, 50M, 50C and 50B shown in FIG. 1, respectively. The light deflecting device 7 deflects (scans) the light beams (laser beams) emitted from the light sources 3 (Y, M, C and B) towards imaging surfaces arranged on predetermined positions, namely, outer peripheral surfaces of the photosensitive drums 58Y, 58M, 58C and 58B of the first to fourth image forming units 50Y, 50M, 50C and 50B shown in FIG. 1 at a predetermined linear speed. Pre-deflection optical systems 5 (Y, M, C and B) are arranged between the light deflecting device 7 and the light sources 3 (Y, M, C and B). A post-deflection optical system 9 is arranged between the light deflecting device 7 and the imaging surfaces.

A direction where the light deflecting device 7 deflects (scans) the laser beams is called as a horizontal scanning direction. A direction, which crosses perpendicularly to the horizontal scanning direction and an axial line as a basis of a deflecting operation which is performed on the laser beams by the light deflecting device so that the laser beams scanned (deflected) by the light deflecting device direct to the horizontal scanning direction, is called as a vertical scanning direction.

The light sources 3 (Y, M, C and B) for the respective color components are constituted so that four pairs of semiconductor laser elements 3Ya and 3Yb, 3Ma and 3Mb, 3Ca and 3Cb, and 3Ba and 3Bb are arranged in predetermined positions.

In the pre-deflection optical systems 5, the laser beams LYa and LYb, LMa and LMb, LCa and LCb, and LBa and LBb emitted from the paired semiconductor laser elements 3Ya and 3Yb, 3Ma and 3Mb, 3Ca and 3Cb, and 3Ba and 3Bb for the respective color components are synthesized into one optical path of each color component by group synthesizing optical parts 15Y, 15M, 15C and 15B for fixing up the same color components into one optical path. Further, the optical paths of each color component are synthesized into one optical path by color synthesizing optical parts 19M, 19C and 19B, and the laser beams L{(LYa+LYb)=LY, (LMa+LMb)=LM, (LCa+LCb)=LC, and (LBa+LBb)=LB} synthesized in such a manner are guided to the light deflecting device 7. Before the laser beams LYa, LMa, LCa and LBa emitted from the lasers 3Ya, 3Ma, 3Ca and 3Ba composing the respective light sources are synthesized with the laser beams LYb, LMb, LCb and LBb by the group synthesizing optical parts 15Y, 15M, 15C and 15B, reflecting angles of corresponding galvano mirrors 18Y, 18M, 18C and 18B are set to predetermined angles. As a result, intervals in the vertical scanning direction are set to predetermined intervals.

As shown in FIG. 4 (arbitrary laser beam L is shown as representative), the pre-deflection optical system 5 has a finite focal lens 13, a diaphragm 14, a group synthesizing optical part 15, and a cylinder lens 17. The finite focal lens 13 gives a predetermined focusing property to the laser beam L emitted from the semiconductor laser element 3. The diaphragm 14 gives an arbitrary sectional beam shape to the laser beam L which passes through the finite focal lens 13. The cylinder lens 17 further gives a predetermined focusing property to the laser beam L synthesized by the group synthesizing optical part 15 in the vertical scanning direction. The pre-deflection optical system 5 shapes the sectional beam shape of the laser beam L emitted from the laser 3 into a predetermined shape so as to guide the laser beam L to the reflecting surface of the light deflecting device 7. In FIG. 4, the galvano mirror 18 and the color synthesizing optical part 19 are omitted.

The light deflecting device 7 has a polygon mirror 7a whose, for example, eight plane reflecting surfaces (plane reflecting mirror) are arranged into a regular polygon shape and a motor 7b for rotating the polygon mirror 7a at a predetermined speed to the horizontal scanning direction.

The post-deflection optical system 9 has a pair of imaging lenses 21 (21a and 21b), a horizontal synchronization sensor, a horizontal synchronization folding mirror 29, a plurality of mirrors 33Y, 35Y and 37Y (Yellow), 33M, 35M and 37M (magenta), 33C, 35C and 37C (Cyan), and 33B (black), and the like. The pair of imaging lenses 21 optimizes shapes and positions of the laser beams L (Y, M, C and B) deflected (scanned) by the polygon mirror 7a on the imaging surfaces. The horizontal synchronization sensor detects the laser beams or a representative laser beam (for example, LB) in order to conform the horizontal synchronization of the laser beams L (Y, M, C and B) passing through the pair of imaging lenses 21. The horizontal synchronization folding mirror 29 folds the laser beams L towards the horizontal synchronization sensor 23. The mirrors 33Y, 35Y, 37Y, 33M, 35M, 37M, 33C, 35C, 37C and 33B guide the laser beams L (Y, M, C and B) for the respective color components emitted from the pair of imaging lenses 21 to the corresponding photosensitive drums 58 (Y, M, C and B).

In the first embodiment, as mentioned later, the horizontal synchronization sensor 23 is different from a conventional one, and it is characterized by installing it in a slanted manner.

FIGS. 5A to 5C are enlarged diagrams illustrating a state that widths of scanning lines of the two laser beams (here, LBa and LBb) for the same color component to be used for detection of the horizontal synchronization at the same deflecting angle are aligned. FIG. 5A is the enlarged diagram in the vertical scanning direction illustrating the enlarged emitting positions of the laser beams LBa and LBb (optical path indicated by a broken line) on the photosensitive drums 58 which are shown by developing folding of the optical path by means of the folding mirror 29 for guiding beams to the horizontal synchronization sensor 23 and folding of the optical paths by means of the mirrors 33Y, 35Y, 37Y, 33M, 35M, 37M, 33C, 35C, 37C, and 33B on FIG. 3. FIGS. 5B and 5C are the enlarged diagrams in the horizontal scanning direction illustrating the emitting positions of the laser beams LBa and LBb (optical path of chief ray indicated by a chain line) on the photosensitive drums 58 in vicinities of a maximum deflecting angle and a minimum deflecting angle shown by developing folding of the optical path by means of the folding mirror 29 for guiding the beams to the horizontal synchronization sensor 23 and folding of the optical paths by means of the mirrors 33Y, 35Y, 37Y, 33M, 35M, 37M, 33C, 35C, 37C and 33B on FIG. 2. FIGS. 5B and 5C correspond to a case where the horizontal synchronization sensor 23 is tilted (posture) shown in FIG. 6, mentioned later.

In FIG. 5A, an up-down direction is the vertical scanning direction, a normal direction is the horizontal scanning direction, and a left-right direction is a direction which crosses perpendicularly to the horizontal scanning direction and the vertical scanning direction (hereinafter, a third direction). In FIGS. 5B and 5C, an up-down direction is the horizontal scanning direction, a normal direction is the vertical scanning direction, and a right-left direction is the third direction.

In the first embodiment, as shown in FIG. 5A, the horizontal synchronization sensor 23 is tilted so that even when the two laser beams LBa and LBb which tilt to the normal direction of the photosensitive drums 58 enter the photosensitive drums 58, the positions in the horizontal scanning direction of the laser beams LBa and LBb whose detected signals are output from the horizontal sensor 23 are aligned.

For example, the horizontal synchronization sensor 23 is placed in a position equivalent to the imaging surface with the optical path lengths of the laser beams LBa and LBb being aligned. As a result, the positions in the horizontal scanning direction of the laser beams LBa and LBb differ form each other at timing that a horizontal synchronized signal is output.

The laser beams LBa and LBb are in the same position in the horizontal scanning direction on the surface to be scanned in order to avoid the above inconvenience. At this time, in order that the horizontal synchronized signals are output, as shown in FIGS. 6A to 6c, 7A to 7C or 8A to 8C, an installation posture of the horizontal synchronization sensor 23 is first determined. A straight line determined by a line which connects cross points of the respective beams may be a position from which the horizontal synchronized signal is output.

Figure 8A:
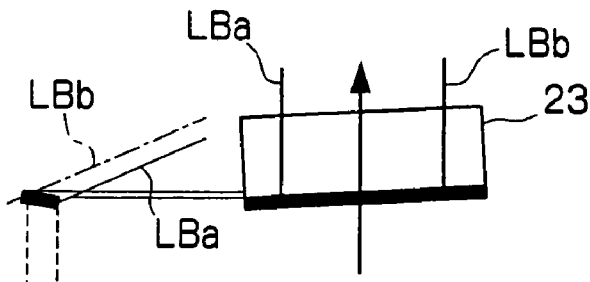
FIGS. 8A to 8C are diagrams explaining a third posture example of the horizontal synchronization sensor according to the first embodiment.
Figure 8B:
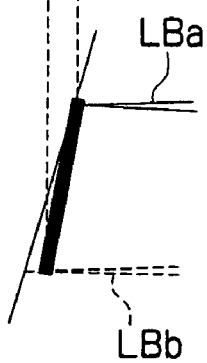
Figure 8C:
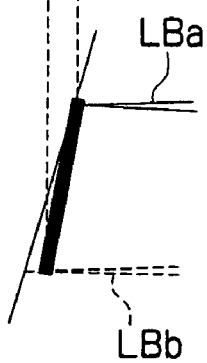

In FIGS. 6A to 8C, FIGS. 6A, 7A and 8A are diagrams illustrating a detecting surface of the horizontal synchronization sensor 23, and in those diagrams, an up-down direction is the horizontal scanning direction, a left-right direction is the vertical scanning direction, and a normal direction is the third direction. In FIGS. 6A, 7A and 8A, a thick line indicates a portion which functions for detection (hereinafter, detection stripe), and scanning trajectories of the laser beams LBa and LBb in the horizontal scanning direction are also written. In FIGS. 6B, 7B, 8B, 6C, 7C and 8C, the detection stripe of the horizontal synchronization sensor 23 is viewed from another direction and is written. In FIGS. 6B, 7B and 8B, an up-down direction is the horizontal scanning direction, a right-left direction is the third direction, and a normal direction is the vertical scanning direction. In FIGS. 6C, 7C and 8C, an up-down direction is the vertical scanning direction, a right-left direction is the third direction, and a normal direction is the horizontal scanning direction.

The example shown in FIGS. 6A to 6C shows the case where the detection stripe has the same tilt as that in the vertical scanning direction on the photosensitive drum as the surface to be scanned. In this case, since the optical path lengths of the laser beams LBa and LBb are the same as those on the photosensitive drums, the positional relationships in the horizontal scanning direction and the vertical scanning direction between the laser beams LBa and LBb on the surface to be scanned are the same. The example shown in FIGS. 7A to 7C is the case where the detection stripe does not have the tilt in the vertical scanning direction. The detection stripe has the tilt in the horizontal scanning direction so that when the laser beams LBa and LBb come to the same position in the horizontal scanning direction, the laser beams cross the detection stripe. The example shown in FIGS. 8A to 8C is the case of an intermediate example of the examples shown in FIGS. 6A to 7C, and the detection stripe tilts in all the directions.

Figure 9A:
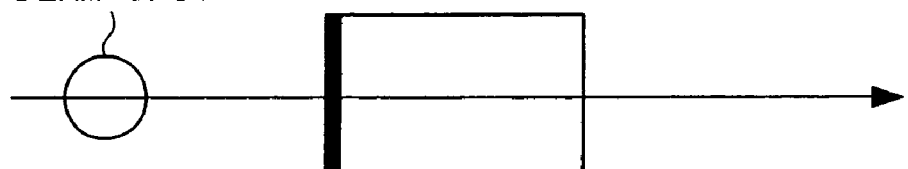
FIGS. 9A and 9B are diagrams explaining a first detecting system of the horizontal synchronization sensor according to the first embodiment.
Figure 9B:
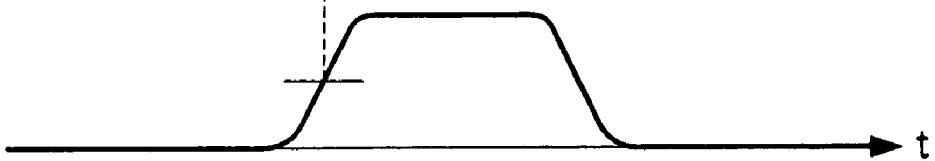

FIGS. 9A and 9B are explanatory diagrams illustrating a first detecting system of the horizontal synchronization sensor 23. When a certain beam (beam spot) moves linearly on the photoelectric sensor (horizontal synchronization sensor) 23 as shown in FIG. 9A, the output after photoelectric conversion changes as shown in FIG. 9B. A predetermined position can be defined at a rise edge of the output. In the case of this detecting system, therefore, a left edge portion (thick line portion) shown in FIG. 9A corresponds to the detection stripe in FIGS. 6A to 8C.

Figure 10:
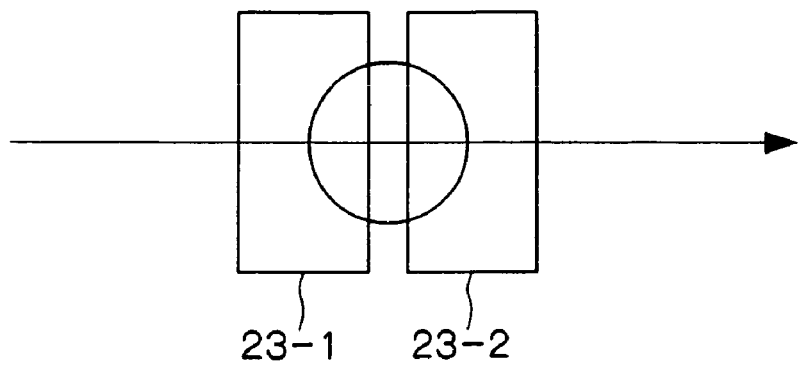
FIG. 10 is a diagram explaining a second detecting system of the horizontal synchronization sensor according to the first embodiment.

FIG. 10 is an explanatory diagram illustrating a second detecting system of the horizontal synchronization sensor 23. As shown in FIG. 10, two photoelectric sensors 23-1 and 23-2 are provided with a gap smaller than the diameter of the beam spot. In this case, when a certain beam (beam spot) moves linearly and the center of the beam spot comes to the gap between the photoelectric sensors 23-1 and 23-2, outputs from the photoelectric sensors 23-1 and 23-2 match with each other. As a result, the predetermined position can be defined. In the case of this detecting system, therefore, the gap between the photoelectric sensors 23-1 and 23-2 shown in FIG. 10 corresponds to the detection stripe explained with reference to FIGS. 6A to 8C.

In the tilted arrangement example of the horizontal synchronization sensor 23 shown in FIGS. 6A to 6C, the position relationship between the laser beams LBa and LBb similar to that on the surface to be scanned can be reproduced on the horizontal synchronization sensor 23. For this reason, it is effective that this example is applied to the case where a beam position detecting function is provided to the horizontal synchronization sensor 23, and its result is fed back to an actuator (for example, the actuator of the galvano mirrors 18Y, 18M 18C and 18B).

The tilted arrangement examples of the horizontal synchronization sensor 23 shown in FIGS. 7A to 8C are effective for the case where the information about the beam relative position in the vertical scanning direction is not necessary. The tilted arrangement example in FIGS. 7A to 7C is effective for the case where a sensor surface is set to be vertical to the optical axis, for example, the case where the housing is made by aluminum die casting and a fixed standard surface of the horizontal synchronization sensor is shaved by a post-process. The tilted arrangement example in FIGS. 8A to 8C is, on the contrary, effective for the case where a predetermined tilt is given in the vertical scanning direction, for example, the case where when a predetermined gradient (draft taper) is given to the standard surface as a molding housing, the tilt angle can be set freely.

In any of the tilted arrangement examples of the horizontal synchronization sensor 23 shown in FIGS. 6A to 8C, every scanning time may be standard timing at which a latent image is written by each beam. In areas other than the vertical scanning direction effective area, differences in the time at which respective beams come to the position of the same horizontal scanning direction on the surface to be scanned may be measured. When latent images are written actually, the horizontal synchronization sensor 23 detects every scanning of only one beam, and the write timing of the other beams may be shifted by the time differences.

When the horizontal synchronization sensor 23 is tried to be provided slantingly, position accuracy and angle accuracy of the sensor surface with respect to an outer shape of the package for covering the sensor surface become easily insufficient. This should be taken into consideration. In the case where accuracy is not much required, the horizontal synchronization sensor 23 may be installed so as to have a standard surface which is integral with the housing and push the package against its standard surface.

According to the optical multi-beam scanning device and the image forming apparatus of the first embodiment, the horizontal synchronization sensor to which the light beams similar to those given to the surface to be scanned are given is installed slantingly. For this reason, even when latent images are written on the surface to be scanned by a plurality of light beams which tilt with respect to the surface to be scanned, displacement in the horizontal scanning direction can be suppressed. As a result, quality of the formed image can be improved.

(B) Second Embodiment

Figure 11:
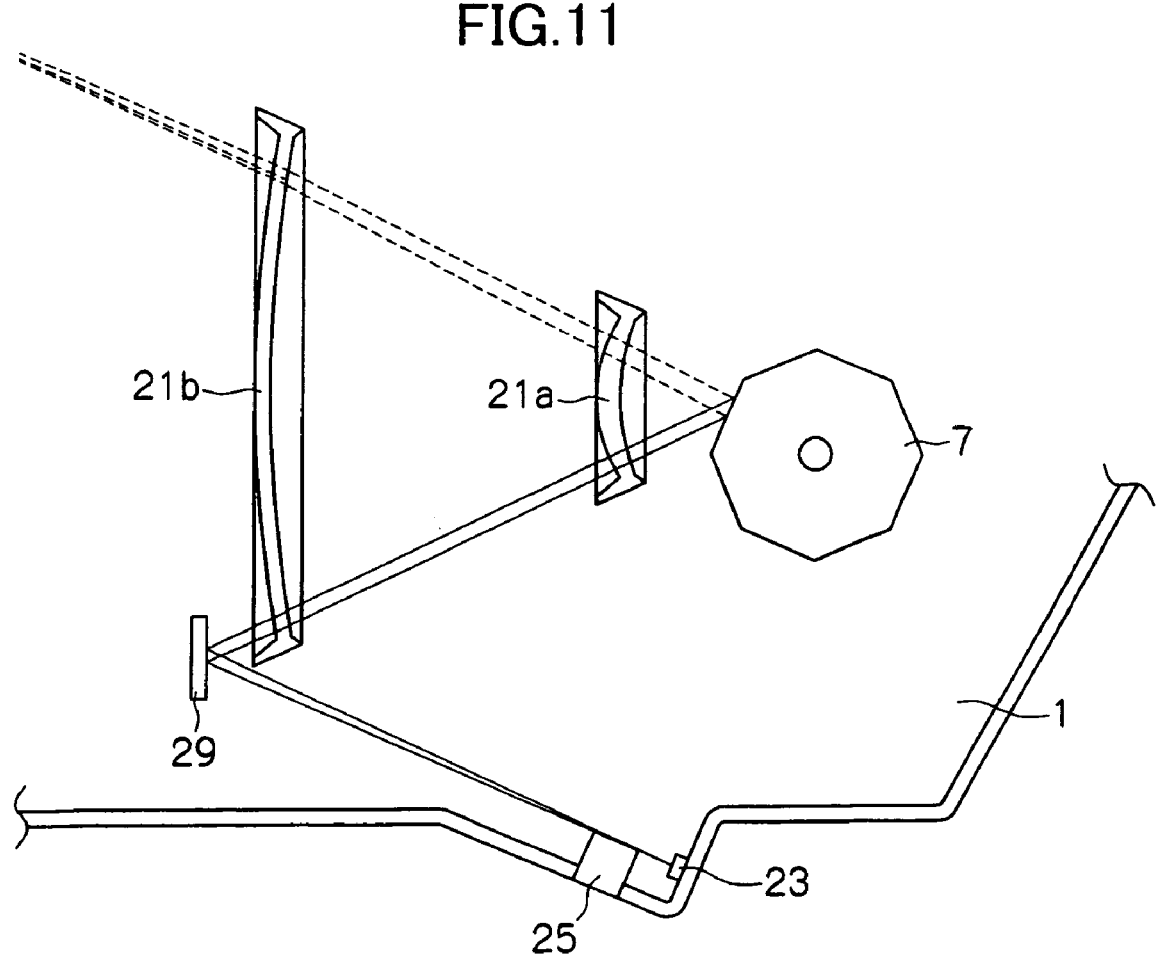
FIG. 11 is a schematic plan view illustrating a constitution of a main portion of the optical multi-beam scanning device according to a second embodiment.

FIG. 11 is a diagram illustrating a constitution of a main section of the optical multi-beam scanning device according to a second embodiment.

In the case of the second embodiment, the constitution of the image forming apparatus into which the optical multi-beam scanning device is incorporated is the same as that in FIG. 1. Meanwhile, the optical multi-beam scanning device according to the second embodiment is, as shown in FIG. 11, different from the first embodiment in the following point. A light shielding member 25 is provided between the folding mirror 29 for guiding light beams to the horizontal synchronization sensor 23 and the horizontal synchronization sensor 23.

Also in the optical multi-beam scanning device according to the second embodiment, the other part of the constitution is similar to that in the first embodiment. The second embodiment 2 is similar to the first embodiment in that the post-deflection optical system 9 having the following constitution is premised. A plurality of light beams, which are deflected by the light deflecting device 7 and transmit through the post-deflection optical system 9, enter the normal of the surface to be scanned at a predetermined angle in the vertical scanning direction. Moving amounts of the light beams in the horizontal scanning direction with respect to the same deflection angle of the light deflecting device 7 are the same as one another.

As explained in the first embodiment, when the horizontal synchronization sensor 23 is tried to be installed slantingly, the position accuracy and the angle accuracy of the sensor surface with respect to the outer shape of the package for covering the sensor surface become easily insufficient. The method of providing the light shielding member 25 is effective for such a situation.

The light shielding member 25 is provided so as to produce the similar state (equivalent state) to the tilted state of the horizontal synchronization sensor 23 explained in the first embodiment without depending on the angle of the horizontal synchronization sensor 23.

FIGS. 12A, 12B and 12C are explanatory diagrams illustrating postures of the light shielding member 25 which produces the similar state (equivalent state) to the tilted state of the horizontal synchronization sensor 23 shown in FIGS. 6A to 6C explained in the first embodiment. FIGS. 12A to 12C correspond to FIGS. 6A to 6C. In FIG. 12A, an up-down direction is the horizontal scanning direction, a right-left direction is the vertical scanning direction, and a normal direction is the third direction. In FIG. 12B, an up-down direction is the horizontal scanning direction, a right-left direction is the third direction, and the normal direction is the vertical scanning direction. In FIG. 12C, an up-down direction is the vertical scanning direction, a right-left direction is the third direction, and a normal direction is the horizontal scanning direction.

In FIGS. 12A to 12C, an edge of a thick line portion is an edge of a boundary where the horizontal synchronization sensor 23 is changed from a light non receiving state (due to shielding by means of the light shielding member 25) into a light receiving state. The horizontal synchronization sensor 23 can detect the predetermined position according to the state change. In this case, the enough large horizontal synchronization sensor 23 should be prepared so that even when its installation position shifts to a certain degree, the scanned laser beams reach the light receiving surface of the sensor 23 from the thick line portion of the light shielding member 25.

When the horizontal synchronization sensor 23 has the function for detecting the beam relative position in the vertical scanning direction, as shown in FIGS. 12A to 12C, the horizontal synchronization sensor 23 is arranged so as to have a tile which is the same as that of the surface to be scanned. As a result, pitches among the beams on the surface to be scanned and pitches between the beams on the sensor surface can be matched with each other. When the light shielding member 25 is, as shown in FIG. 11, integral with the housing for holding the post-deflection optical system, an error due to its incorporating can be avoided so that accuracy can be easily obtained.

FIGS. 12A to 12C are the diagrams illustrating the postures of the light shielding member 25 which produces the similar state (equivalent state) to the tilted state of the horizontal synchronization sensor 23 shown in FIGS. 6A to 6C explained in the first embodiment. The posture of the light shielding member 25 may be set, however, so as to produce the similar states (equivalent state) to the tilted states of the horizontal synchronization sensor 23 shown in FIGS. 7A to 8C explained in the first embodiment according to the installation conditions. These states are not shown.

The technical idea that the light shielding member 25 intervenes can be applied to the case where the wavelengths from the light sources 3 (Y, M, C and B) are different from one another and thus an optical path correcting element 27 should be provided (see a third embodiment, mentioned later).

According to the optical multi-beam scanning device and the image forming apparatus of the second embodiment, the light shielding member as the edge portion is provided before the horizontal synchronization sensor to which the light beams similar to those to be given to the surface to be scanned are given. For this reason, even when latent images are written on the surface to be scanned by the light beams which tilt with respect to the surface to be scanned, the displacement in the horizontal scanning direction can be suppressed. As a result, the quality of a formed image can be improved.

(C) Third Embodiment

FIG. 13 is a diagram illustrating only an optical path between the folding mirror 29 and the horizontal synchronization sensor 23 in the optical multi-beam scanning device according to a third embodiment which is different form that in the first and the second embodiments. In the third embodiment, the optical multi-beam scanning device has the optical path correcting element 27 shown in FIG. 16 between the folding mirror 29 for guiding light to the horizontal synchronization sensor 23 and the horizontal synchronization sensor 23. In the first and second embodiments, the method of making the wavelengths from the light sources different from one another can be combined with, for example, methods of varying an incident angle to the post-deflection optical element other than the method of making the scanning widths among the beams with different optical paths uniform at the same deflecting angle. In the third embodiment, however, when the wavelengths of the light sources 3 (3Ya, 3Yb, 3Ma, 3Mb, 3Ca, 3Cb, 3Ba and 3Bb) for emitting beams for creating the same latent images are made to be different, the scanning widths among the beams with different optical paths are aligned with one another.

The function of the optical path correcting element 27 is explained. The optical path correcting element 27 is provided for the case adopting a system such that the wavelengths from the light sources 3 (Y, M, C and B) are made to be different from one another and magnification chromatic aberration of the post-deflection optical system is canceled.

Figure 14:
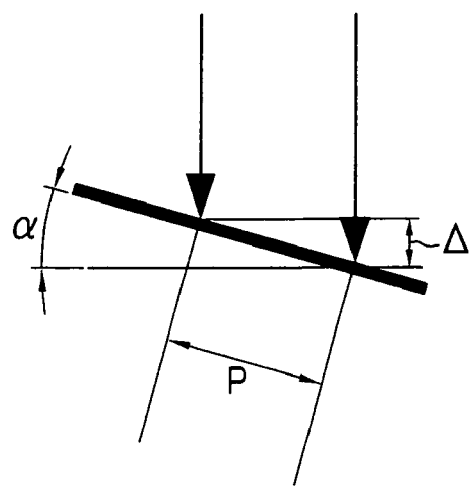
FIG. 14 is a diagram (1) explaining necessity of an optical path correcting element according to the third embodiment.

A case where when the incident angle $\alpha$ to the photosensitive drum 58 is 15° and a scanning linear density in the vertical scanning direction is 600 dpi, and two beams are scanned with a pitch of 42.33 μm is considered (see FIG. 14). A difference in the optical paths between the two beams is generally expressed by $\Delta = P \times \sin\alpha$ on the optical axis (P is a distance between the light beams on the surface to be scanned, and $\alpha$ is the incident angle of the light beams to the surface to be scanned (photosensitive drum)). In this case, the difference between the optical paths $\Delta$ becomes 0.010956673 mm. When an angle (deflecting angle) at the scanning end is 30°, a shift of the beam position in the horizontal scanning direction due to the difference in the optical paths becomes $\Delta \times \tan(30 \deg) = 0.006325838$.

Figure 15:
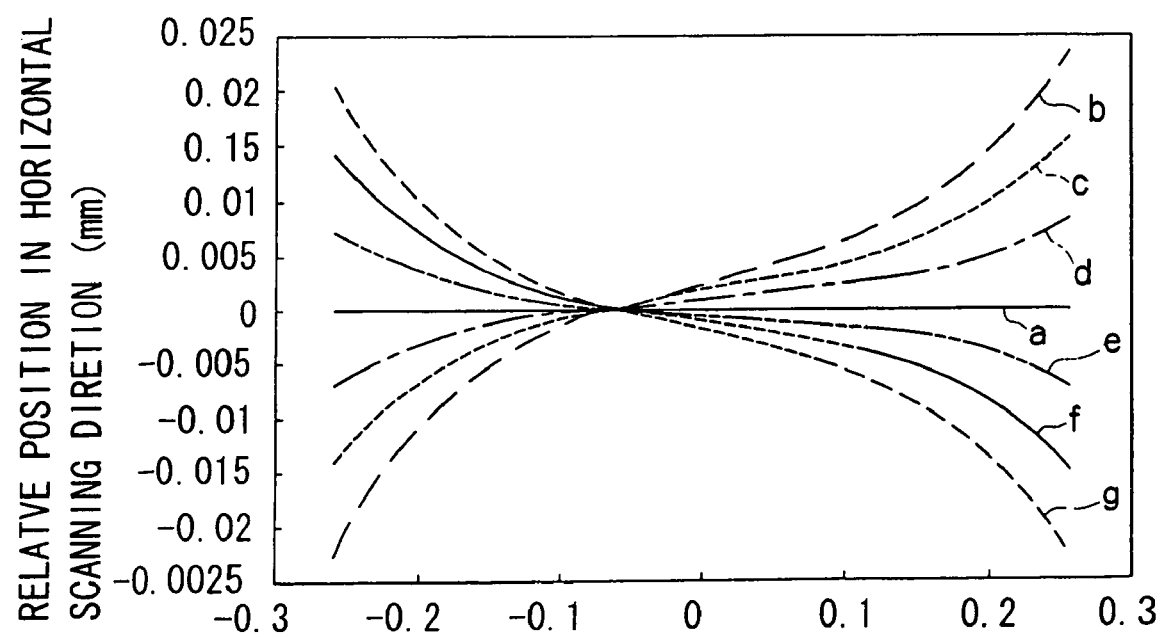
FIG. 15 is a diagram (2) explaining necessity of the optical path correcting element according to the third embodiment.

FIG. 15 is a graph illustrating a change in the positions of the laser beams passing through the paired imaging lenses 21a and 21b and are imaged on the imaging surface as a relative position in the horizontal scanning direction when the wavelengths of the laser beams emitted from the semiconductor laser elements (light sources) change. When the laser beam with wavelength of 680 nm (curved line a) is used as a standard, positions of the laser beams with wavelengths of 665 nm (curved line b), 670 nm (curved line c), 675 nm (curved line d), 685 nm (curved line e), 690 nm (curved line f) and 695 nm (curved line g) in the horizontal scanning direction are shown. According to the graph, when the light sources with a difference in the wavelength of 5 nm are used, the displacement of the beams due to the difference in the optical paths and the displacement of the beams due to the difference in the wavelengths can be canceled.

When such a difference in the wavelengths are set and the displacements are canceled, the optical path correcting element 27 for making not the wavelengths but the beam positions on the horizontal synchronization sensor 23 uniform is provided before the horizontal synchronization sensor 23. As a result, even if the horizontal synchronization sensor 23 is provided so as not to have a tilt in the horizontal scanning direction and the vertical scanning direction similarly to the conventional manner, when the positions in the horizontal scanning direction on the photosensor match with one another, the beams can come to the detection stripe on the horizontal synchronization sensor 23.

The optical path correcting element 27 is provided on the optical path between the imaging lenses 21 and the horizontal synchronization sensor 23. It is composed of a prism or a diffraction grating which can change the emitting angle according to a fluctuation in the wavelengths of the laser beams form the light sources in the horizontal scanning direction, and can shift the beam positions with the same amount as and to an opposite direction to the displacement generated by the imaging lenses due to the difference in the wavelengths. Even when the wavelengths of the laser beams fluctuate, the beams can be guided to the same position on the detecting surface of the horizontal synchronization sensor 23.

Figure 16:
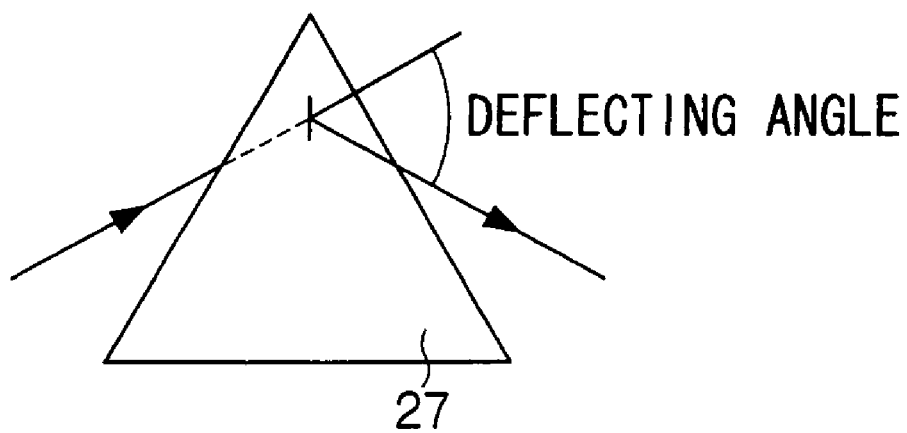
FIG. 16 is a plan view illustrating a specific example of the optical path correcting element according to the third embodiment.

As the optical path correcting element 27, a prism whose sectional shape is an isosceles triangle shown in FIG. 16 can be used. As a method of selecting various parameters in the case which adopts the prism shown in FIG. 16, a method disclosed in Japanese Patent Application Laid-Open No. 11-194285 (1999) can be adopted.

The optical path correcting element 27 is provided so as to guide the beams to the same position in the horizontal scanning direction on the detecting surface of the horizontal synchronization sensor 23 regardless of the fluctuation in the wavelengths. As a result, even when the difference in wavelengths fluctuates due to mode hopping or the like caused by temperature change while the lengths of the scanning lines are aligned, a shift of the relative printing position can be suppressed to ½. As shown in FIG. 1, a plurality of beams are used in order to write four latent images on the four photosensitive drums (or photosensitive belts, four places on the photosensitive drum) 58 (Y, M, C and B). Even when the angles in the vertical scanning direction at which the beams enter the photosensitive drums are different from one another, the constitution including the optical path correcting element 27 can suppress the displacement of the beams in the horizontal scanning direction even at the use of a common part or each set of parts.

Figure 17:
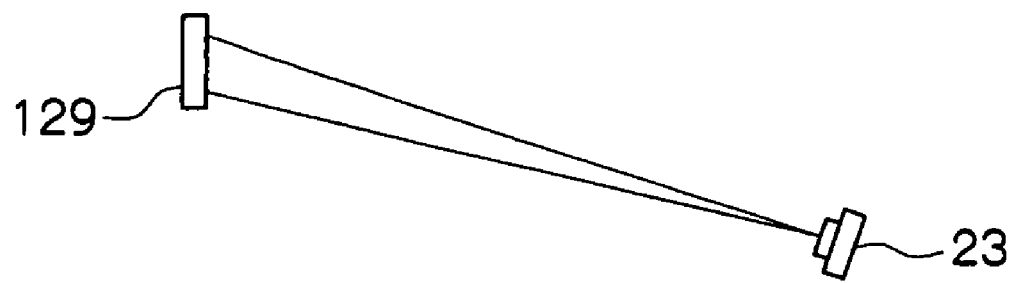
FIG. 17 is a schematic plan view illustrating an optical path between a reflection type diffraction grating which folds the optical path to the horizontal synchronization sensor and the horizontal synchronization sensor in a modified example of the third embodiment.
Figure 18:
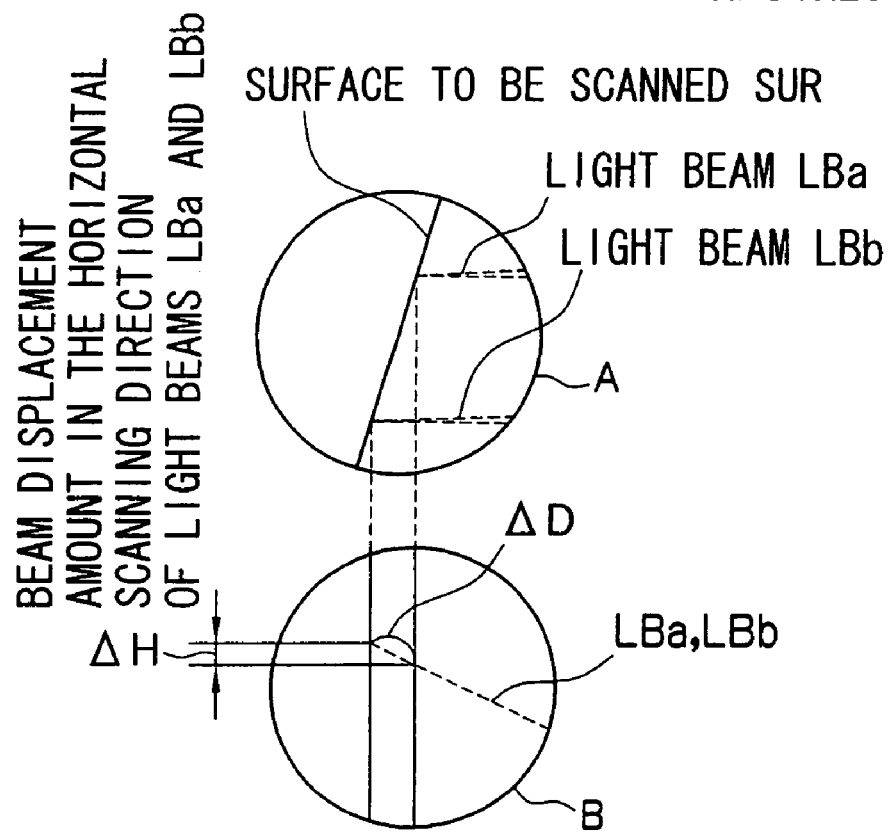
FIG. 18 is a diagram explaining a reason that displacement in the horizontal scanning direction among the beams occurs in a conventional technique.

FIG. 17 is a diagram illustrating a reflection type diffraction grating 129 in which the function of the folding mirror 29 in FIG. 13 is integral with the function of the optical path correcting element 27. The reflection type diffraction grating 129 leads the beams to the horizontal synchronization sensor 23. Its function and effect are the same as those when the optical path correcting element 27 is provided.

According to the optical multi-beam scanning device and the image forming apparatus according to the third embodiment, the system of making the wavelengths from the light sources different so as to cancel the magnification chromatic aberration of the post-deflection optical system is adopted. In this case, the optical path correcting element is provided, so that the beams are emitted to the same position of the horizontal synchronization sensor even when the wavelengths fluctuate due to temperature. For this reason, the displacement in the horizontal scanning direction can be suppressed, and thus the quality of the formed image can be improved.

(D) Another Embodiment

The technical idea that the optical path correcting element and the reflection type diffraction grating according to the third embodiment are provided can be combined with the technical ideas in the first and second embodiments.

The present invention can be widely applied to the optical multi-beam scanning device including the component for tilting the beams to the vertical scanning direction with respect to the normal direction of the surface to be scanned and emitting the beams to the surface to be scanned, and the image forming apparatus including such an optical multi-beam scanning device. The present invention can be, therefore, applied to various apparatuses for color and monochrome modes and to an apparatus for the color mode adopting a constitution for scanning only black with a plurality of beams.

What is claimed is:

1. An optical multi-beam scanning device, comprising:
   a plurality of light sources;
   deflecting means for deflecting light beams from the light sources;
   post-deflection optical means for making the light beams deflected by the deflecting means enter a surface to be scanned in a vertical scanning direction with respect to a normal direction of the surface to be scanned at a predetermined angle; and
   horizontal synchronization detecting means for synchronizing the light beams in a horizontal scanning direction,
   wherein a light receiving surface of the horizontal synchronization detecting means is tilted in the vertical scanning direction so as to output a horizontal synchronized signal when the light beams come to the same position on the surface to be scanned in the horizontal scanning direction.

2. The optical multi-beam scanning device according to claim 1, wherein the light receiving surface of the horizontal synchronization detecting means is tilted in the vertical scanning direction at an angle equivalent to that of the surface to be scanned.

3. The optical multi-beam scanning device according to claim 1, wherein when a tilting direction of the light receiving surface of the horizontal synchronization detecting means is assumed to be in a plane formed in the vertical scanning direction and the horizontal scanning direction, and the tilting angle is a direction such that the horizontal synchronized signal is output when the light beams are on the same position on the surface to be scanned in the horizontal scanning direction.

4. The optical multi-beam scanning device according to claim 1, wherein a tilting angle of the light receiving surface of the horizontal synchronization detecting means includes the horizontal scanning direction, the vertical scanning direction, and a direction perpendicular to the horizontal scanning direction and the vertical scanning direction.

5. The optical multi-beam scanning device according to claim 1, wherein a relationship among wavelengths of the light beams from the light sources is set so that their moving amounts in the horizontal scanning direction with respect to a deflecting angle are uniform, an optical element for changing an emitting angle according to a fluctuation in the wavelengths of the light beams emitted from the light sources is arranged on an optical path between the deflecting means and the horizontal synchronization detecting means.

6. An image forming apparatus, comprising:

the optical multi-beam scanning device according to claim 1; and a photoreceptor having a surface to be scanned on which latent images are formed based on light beams from the optical multi-beam scanning device.

7. The optical multi-beam scanning device according to claim 1, further comprising:

optical path folding means for folding the light beams, directing towards the surface to be scanned, to the horizontal synchronization detecting means.

8. An optical multi-beam scanning device, comprising:

a plurality of light sources;

a deflecting device configured to deflect light beams from the light sources;

a post-deflection optical system configured to make the light beams deflected by the deflecting device enter a surface to be scanned in a vertical scanning direction with respect to a normal direction of the surface to be scanned at a predetermined angle; and a horizontal synchronization sensor configured to synchronize the light beams in a horizontal scanning direction, wherein a light receiving surface of the horizontal synchronization sensor is tilted in the vertical scanning direction so as to output a horizontal synchronized signal when the light beams come to the same position on the surface to be scanned in the horizontal scanning direction.

* * * * *